(12) United States Patent
Ueda et al.

(10) Patent No.: US 7,781,519 B2
(45) Date of Patent: Aug. 24, 2010

(54) SOLUBILIZER AND COMPOSITION CONTAINING SAME

(75) Inventors: Rumi Ueda, Iwaki (JP); Naoki Hayashi, Iwaki (JP); Yutaka Kobayashi, Iwaki (JP); Tomomi Ujiie, Tokyo (JP); Hiroki Katono, Iwaki (JP)

(73) Assignee: Kureha Corporation, Tokyo (JP)

( * ) Notice: Subject to any disclaimer, the term of this patent is extended or adjusted under 35 U.S.C. 154(b) by 358 days.

(21) Appl. No.: 10/592,123

(22) PCT Filed: Mar. 9, 2005

(86) PCT No.: PCT/JP2005/004117
§ 371 (c)(1),
(2), (4) Date: May 31, 2007

(87) PCT Pub. No.: WO2005/087870
PCT Pub. Date: Sep. 22, 2005

(65) Prior Publication Data
US 2007/0244221 A1    Oct. 18, 2007

(30) Foreign Application Priority Data
Mar. 10, 2004 (JP) .............................. 2004-068005

(51) Int. Cl.
*C08K 5/49* (2006.01)
*C08K 5/06* (2006.01)

(52) U.S. Cl. .................... 524/781; 524/366; 524/115

(58) Field of Classification Search ................. 524/366, 524/781, 115
See application file for complete search history.

(56) References Cited

U.S. PATENT DOCUMENTS

| 4,296,214 A * | 10/1981 | Kamada et al. ............. 524/398 |
| 6,497,949 B1 * | 12/2002 | Hyde et al. ........... 428/355 EN |
| 2002/0050587 A1 * | 5/2002 | Hayashi et al. ............. 252/582 |

FOREIGN PATENT DOCUMENTS

| JP | 62-114932 | 5/1987 |
| JP | 06-287209 | 10/1994 |
| JP | 9211220 | 8/1997 |
| JP | 10-152598 | 6/1998 |
| JP | 11-302308 | 11/1999 |
| JP | 11-315215 | 11/1999 |
| JP | 2002-069305 | 3/2002 |
| JP | 2002-071941 | 3/2002 |
| WO | 2003/065082 | 8/2003 |

OTHER PUBLICATIONS

Aldrich Handbook of fine chemicals and Laboratory Equipment, 2000-2001, pp. 234, 1363, 1365, 1388, 1436, 1559, 1560.*

* cited by examiner

*Primary Examiner*—Satya B Sastri
(74) *Attorney, Agent, or Firm*—Reed Smith LLP

(57) ABSTRACT

The present invention provides a solubilizing agent that can give solubility or dispersibility in resins to copper-containing phosphorus compounds, and a composition containing the solubilizing agent. The solubilizing agent of the invention comprises a compound represented by the following general formula (100) having a main chain with an oxyalkylene unit.

[Chemical Formula 1]

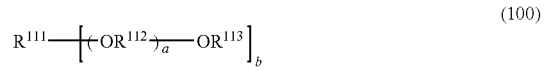

[wherein $R^{111}$ represents hydrogen or a b-valent organic group, $R^{112}$ represents C2-4 alkylene, $R^{113}$ represents hydrogen, alkyl, aryl or acyl, a represents an integer of 1-50 and b represents an integer of 1-4.]

2 Claims, 2 Drawing Sheets

SOLUBILIZER AND COMPOSITION CONTAINING SAME

TECHNICAL FIELD

The present invention relates to a solubilizing agent and to a composition comprising it.

BACKGROUND ART

In recent years, heat ray-absorbing complexes that exhibit highly efficient blocking performance for near-infrared rays or light rays in longer wavelength region than near-infrared rays have been known, which are also capable of exhibiting high visible light transmission and sufficient heat resistance or surface hardness. Such infrared-absorbing complexes are used as optical members including laminated glass, for example. The laminated glass is obtained by forming an interlayer made of an infrared-absorbing composition between two glass panels. The infrared-absorbing composition is composed of a resin component and an infrared-absorbing component, where the infrared-absorbing component contains copper ion and a phosphorus compound such as a phosphoric acid ester or phosphonic acid ester (for example, see Japanese Unexamined Patent Publication HEI No. 9-211220).

DISCLOSURE OF THE INVENTION

Problems to be Solved by the Invention

With the increasing importance of optical members such as laminated glass in recent years, there has been a demand for further improved visible light transmittance (translucency). It has therefore been desirable to develop compositions with more excellent translucency as materials for the interlayers in laminated glass.

It is an object of the present invention, which has been accomplished in light of the circumstances described above, to provide a solubilizing agent capable of imparting copper-containing phosphorus compounds with solubility or dispersibility in resins, as well as a composition comprising it.

Means for Solving the Problems

In order to achieve the object stated above, the present inventors have conducted much diligent research on the spectral characteristics of compositions comprising copper-containing phosphorus compounds, and have completed this invention upon discovering that including a compound with a specific structure increases the solubility or dispersibility of copper-containing phosphorus compounds and yields superior translucency.

Specifically, the solubilizing agent of the invention is characterized by comprising a compound represented by the following general formula (100) having a main chain with an oxyalkylene unit.

[Chemical Formula 1]

(100)

[wherein $R^{111}$ represents hydrogen or a b-valent organic group, $R^{112}$ represents C2-4 alkylene, $R^{113}$ represents hydrogen, alkyl, aryl or acyl, a represents an integer of 1-50 and b represents an integer of 1-4.]

The solubilizing agent of the invention can impart copper-containing phosphorus compounds with solubility or dispersibility in resins. Thus, a composition containing the solubilizing agent, a copper-containing phosphorus compound and a resin can exhibit translucency that is dramatically superior to the prior art.

The constituent compounds of the solubilizing agent have a main chain with an oxyalkylene unit, and include no compounds with oxyalkylene units only on side chains. The "main chain" in a compound according to the invention is the molecular chain of greatest length among the molecular chains composing the compound, and when the compound is a polymer, it is the molecular chain that extends in the direction of polymerization of the polymer.

The solubilizing agent of the invention preferably is one wherein b is 1. More preferably, b is 1 and $R^{111}$ and $R^{113}$ are identical groups.

Preferred solubilizing agents of the invention are those wherein $R^{113}$ is a group represented by the following general formula (101) and a is an integer of 4-50.

[Chemical Formula 2]

(101)

[wherein $R^{114}$ is an alkyl group.]

The solubilizing agent is preferably one wherein $R^{113}$ is hydrogen and $R^{112}$ is a C3 or 4 alkylene group. An interlayer film containing the solubilizing agent exhibits satisfactory excellent translucency.

Also preferred is a solubilizing agent wherein $R^{113}$ is (meth)acryloyl. An interlayer film containing the solubilizing agent exhibits not only excellent translucency but also excellent humidity resistance.

The solubilizing agent may also be one wherein $R^{112}$ is ethylene and a is an integer of 2-14. In other words, the solubilizing agent is preferably one having an oxyethylene unit as the oxyalkylene unit and having 2-14 repeating units. A composition comprising a solubilizing agent having such a structure, a copper-containing phosphorus compound and a resin exhibits no turbidity even after prolonged storage, and therefore can maintain its excellent translucency for extended periods.

Also preferred is a solubilizing agent wherein $R^{112}$ is ethylene and a is an integer of 9-23. In other words, the solubilizing agent may be one having an oxyethylene unit as the oxyalkylene unit and having 9-23 repeating units. A composition comprising a solubilizing agent having such a structure, a copper-containing phosphorus compound and a resin exhibits excellent light resistance.

The present invention also provides a composition comprising a solubilizing agent of the invention, a copper-containing phosphorus compound and a resin.

Such a composition contains a solubilizing agent capable of imparting copper-containing phosphorus compounds with solubility or dispersibility in resins, and thus exhibits excellent translucency. Furthermore, since the composition contains copper it can exhibit excellent absorption characteristics for heat rays containing near-infrared light (for example, light with wavelength of about 700-1200 nm) (hereinafter referred to as "infrared rays").

It has been the experience of the present inventors that with conventional resin compositions comprising copper-containing phosphorus compounds and resins, it is often difficult to uniformly dissolve or disperse certain types of copper-containing phosphorus compounds in the resins. However, the solubilizing agent in the composition of the invention imparts the copper-containing phosphorus compound with sufficient solubility or dispersibility for resins, thereby increasing the compatibility with resins. As a result, the composition of the invention can exhibit translucency that is dramatically superior to the prior art.

EFFECT OF THE INVENTION

The present invention provides a solubilizing agent that can impart copper-containing phosphorus compounds with solubility or dispersibility in resins. It is also possible to provide a composition comprising the solubilizing agent, a copper-containing phosphorus compound and a resin.

EXPLANATION OF SYMBOLS

Figure 1:
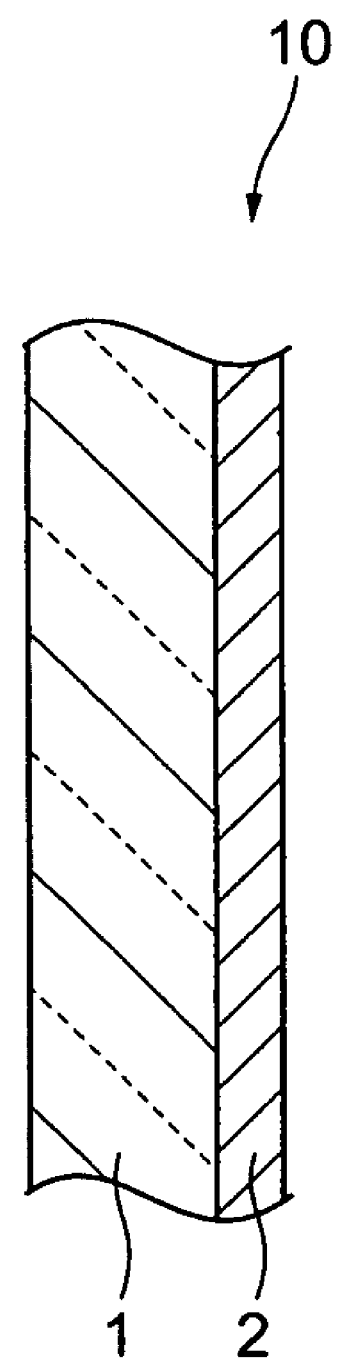
FIG. 1 is a schematic cross-sectional view of an example of an optical member according to the invention.

1: Flat base material, 2: infrared-absorbing composition layer, 10: window material.

BEST MODE FOR CARRYING OUT THE INVENTION

Preferred embodiments of the invention will now be described in detail.

The solubilizing agent will be explained first. The solubilizing agent comprises a compound having a main chain with an oxyalkylene unit. So long as the compound has an oxyalkylene unit on its main constituent chain, it may also have a structural unit other than the oxyalkylene unit. As structural units other than oxyalkylene units there may be mentioned groups capable of bonding with oxyalkylene units such as, for example, urethane, urea, carbonate, ester and amide groups. As terminal groups bonded to the main chain of the compound there may be mentioned hydrogen and monovalent hydrocarbon groups, with preferred monovalent hydrocarbon groups being C1-30 straight-chain, branched or cyclic alkyl, C2-30 acyl, and C6-30 aryl or aralkyl groups. An alkyl group may be one wherein one or more hydrogens bonded to carbon atoms of the alkyl group are substituted with halogen atoms, hetero atoms or aromatic rings.

As oxyalkylene units there may be mentioned oxyethylene units, oxypropylene units, oxybutylene units, oxytetramethylene units, oxypentylene units and oxyhexylene units. Preferred among these from the standpoint of improved solubility or dispersibility of the copper-containing compound in resins are C2-4 oxyalkylene units, such as oxyethylene, oxypropylene, oxybutylene and oxytetramethylene units. An oxypropylene unit may have the secondary carbon of the propylene group bonded to oxygen, or the primary carbon bonded to oxygen.

The oxyalkylene unit may be composed of a single type (for example, an oxyethylene unit) or different types (for example, an oxyethylene unit and oxypropylene unit) of oxyalkylene units, and in the latter case it may be a block copolymer or random copolymer.

The number of repeats of the oxyalkylene unit is preferably 1-50 from the standpoint of improving the solubility and dispersibility of the copper-containing compound in resins. The number of repeats is more preferably 2-14 from the standpoint of long-term storage properties, and more preferably 9-23 from the standpoint of improved light resistance. A number of repeats of 9-14 can provide both excellent long-term storage properties and light resistance.

A preferred solubilizing agent is one composed of a compound represented by the following general formula (100).

[Chemical Formula 3]

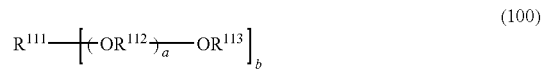

(100)

[wherein $R^{111}$ represents hydrogen or a b-valent organic group, $R^{112}$ represents C2-4 alkylene, $R^{113}$ represents hydrogen, alkyl, aryl or acyl, a represents an integer of 1-50 and b represents an integer of 1-4.]

Preferred among compounds represented by general formula (100) above are those wherein b is 1. Such compounds may be represented by the following general formula (1).

[Chemical Formula 4]

$R^1$—(O-A)$_n$-OR$^2$ (1)

In general formula (1) above, $R^1$ and $R^2$ each independently represent hydrogen, C2-20 acyl, C1-25 straight-chain, branched or cyclic alkyl or C6-30 aryl or aralkyl, wherein at least one hydrogen bonded to a carbon atom of the alkyl group is optionally substituted with a halogen atom, hetero atom or aromatic ring. "A" represents a C2-4 alkylene group and n represents 1-50. The number of carbon atoms of the acyl group is preferably 2-15, and more preferably 2-10. The number of carbon atoms of the alkyl group is preferably 1-20, and more preferably 1-15. The number of carbon atoms of the aryl or aralkyl group is preferably 6-25, and more preferably 6-20. The number of carbon atoms of the alkylene group represented by "A" is preferably 2-3, and more preferably 2. The letter "n" is preferably 1-40 and more preferably 1-30.

The acyl groups represented by $R^1$ and $R^2$ in general formula (1) above also include divalent acid groups derived from dicarboxylic acids, and as examples there may be mentioned 2-ethylbutanoyl, (meth)acryloyl, propionyl, butyryl, valeryl, isovaleryl, hexanoyl, heptanedioyl, oxalyl, malonyl, palmitoyl, stearoyl, oleoyl and 2-ethylhexanoyl. Preferred among these are (meth)acryloyl and 2-ethylhexanoyl. As alkyl groups represented by $R^1$ and $R^2$ there may be mentioned methyl, ethyl, propyl, butyl, amyl, hexyl, nonyl, lauryl, stearyl and oleyl. Preferred groups among these are methyl, lauryl, stearyl and oleyl. As aryl or aralkyl groups represented by $R^1$ and $R^2$ there are preferred phenyl and 4-nonylphenyl. As alkylene groups represented by "A" there are preferred ethylene, propylene, butylene and tetramethylene. Utilizing such groups can notably improve the solubility and dispersibility of the copper-containing phosphorus compound in resins.

More preferred as compounds represented by general formula (100) above are those wherein b is 1 and $R^{111}$ and $R^{113}$ are identical groups. Suitable groups having such a structure may be classified into the following three types.

First, there may be mentioned compounds wherein $R^{113}$ is a group represented by the following general formula (101) and a is an integer of 4-50. In formula (101), $R^{114}$ is an alkyl group.

[Chemical Formula 5]

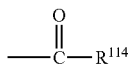
(101)

As examples of such compounds there may be mentioned compounds represented by the following general formula (5). In general formula (5), n is an integer of 4-50.

[Chemical Formula 6]

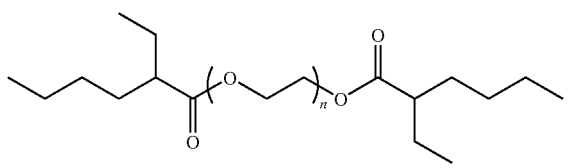
(5)

Second, there may be mentioned compounds wherein $R^{113}$ is a (meth)acryloyl group. As such compounds there may be mentioned compounds represented by the following general formulas (2)-(4). The term "meta" in parentheses is used for convenience and simplicity of expression where it is necessary to indicate both acrylic acid or its derivative and methacrylic acid or its derivative, and it is employed as such throughout the present specification (same hereunder).

[Chemical Formula 7]

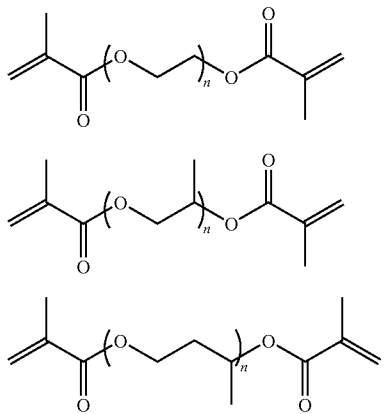
(2)
(3)
(4)

Third, there may be mentioned compounds wherein $R^{113}$ is hydrogen and $R^{112}$ is a C3 or 4 alkylene group. As such compounds there may be mentioned polypropylene glycol and polybutylene glycol.

(Composition)

The composition will now be described. The composition contains the aforementioned solubilizing agent, a copper-containing phosphorus compound and a resin. Because the composition contains a solubilizing agent, the solubility and dispersibility of the copper-containing phosphorus compound in resins is enhanced. The composition can therefore exhibit very high translucency and exhibits infrared-absorbing performance, rendering it suitable for various uses including visibility compensation, photometry, near-infrared light blockage, heat ray absorption and brightness adjustment. The composition can therefore be suitably used as an optical material in an optical member as described hereunder.

As copper-containing phosphorus compounds there are preferred those having ionic bonds and/or coordination bonds between copper ion and the phosphorus compound. Including copper ion will allow selective absorption of near-infrared light by d orbital electron transition, thereby exhibiting an excellent infrared-absorbing characteristic. Such compounds may be obtained, for example, by mixing a copper salt with a phosphorus compound and reacting them in an appropriate solvent.

The total ratio of hydroxyl groups in the phosphorus compound with respect to copper ion (OH/Cu) is preferably 1-6, more preferably 1-4 and even more preferably 1.5-2.5, as the molar ratio. If this ratio is less than 1, the infrared-absorbing performance and translucency will tend to be insufficient, while if the ratio is greater than 6, a greater proportion of hydroxyl groups will not participate in coordination bonding and/or ionic bonding with the copper ion, thereby tending to increase the hygroscopicity.

As copper salts there may be mentioned anhydrides or hydrates of copper salts of organic acids, such as copper acetate, copper acetate monohydrate, copper formate, copper stearate, copper benzoate, ethylacetocopper acetate, copper pyrophosphate, copper naphthenate and copper citrate, and anhydrides or hydrates of copper salts of inorganic acids, such as copper hydroxide, copper chloride, copper sulfate, copper nitrate and basic copper carbonate. Preferred among these are copper acetate, copper acetate monohydrate, copper benzoate, copper hydroxide and basic copper carbonate.

The composition of this embodiment may also contain metal ions other than copper ion. As other metal ions there may be mentioned ions of metals such as rare earth metals, sodium, potassium, lithium, calcium, strontium, iron, manganese, magnesium, nickel, chromium, indium, titanium, antimony, tin and the like. Examples of rare earth metals include neodymium, praseodymium and holmium. Rare earth metals have excellent absorption characteristics for light of specific wavelengths (near 580 nm or near 520 nm) due to f orbital electron transition of the rare earth ions, and because this wavelength range matches the maximum response wavelength of human ocular visual cells, such metals can contribute to the antiglare property of the composition.

As phosphorus compounds there may be mentioned phosphonic acid monoester compounds represented by the following general formula (6), phosphinic acid compounds represented by the following general formula (7), phosphoric acid ester compounds represented by the following general formula (8) or (9), and phosphonic acid compounds represented by the following general formula (10). These compounds may be used alone or in combinations of two or more.

[Chemical Formula 8]

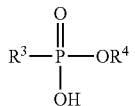 (6)

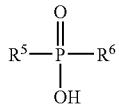 (7)

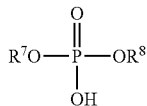 (8)

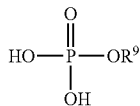 (9)

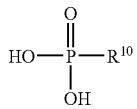 (10)

In the formulas shown above, $R^3$-$R^{10}$ each independently represent a C1-30 branched, straight-chain or cyclic alkyl, alkenyl, alkynyl, aryl, allyl, oxyalkyl, polyoxyalkyl, oxyaryl, polyoxyaryl, (meth)acryloyloxyalkyl or (meth)acryloylpolyoxyalkyl group, optionally with at least one hydrogen substituted with a halogen atom or an oxyalkyl, polyoxyalkyl, oxyaryl, polyoxyaryl, acyl, aldehyde, carboxyl, hydroxyl, (meth)acryloyl, (meth)acryloyloxyalkyl, (meth)acryloylpolyoxyalkyl or ester group.

Preferred for $R^3$-$R^{10}$ in formulas (6), (7), (8), (9) and (10) are groups represented by the following general formulas (11)-(21).

[Chemical Formula 9]

 (11)

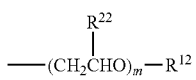 (12)

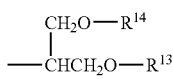 (13)

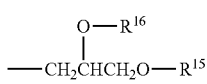 (14)

 (15)

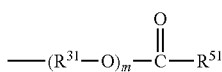 (16)

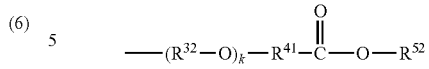 (17)

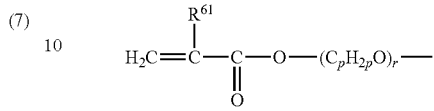 (18)

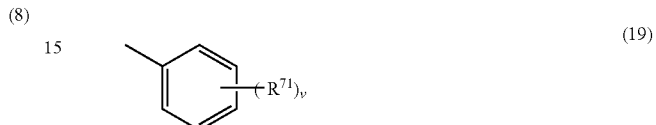 (19)

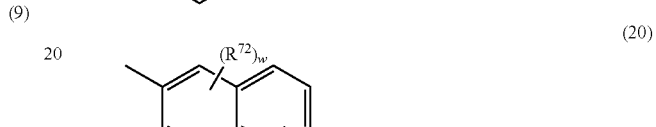 (20)

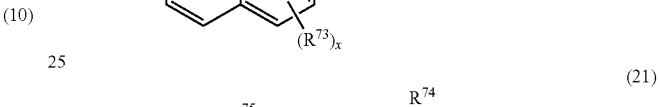 (21)

In formulas (11)-(21) above, $R^{11}$-$R^{17}$ each represent a C1-20 alkyl group or C6-20 aryl or aralkyl group, wherein at least one hydrogen bonded to a carbon atom of the aromatic ring is optionally substituted with C1-6 alkyl or a halogen atom, and $R^{21}$-$R^{25}$ each represent hydrogen or a C1-4 alkyl group (with the proviso that $R^{23}$, $R^{24}$, and $R^{25}$ are not all hydrogen).

Also, $R^{31}$ and $R^{32}$ each represent a C1-6 alkylene group, $R^{41}$ represents a C1-10 alkylene group, $R^{51}$ and $R^{52}$ each represent a C1-20 alkyl group, $R^{61}$ represents hydrogen or methyl, m represents an integer of 1-6, k represents an integer of 0-5, p represents an integer of 2-97 and r represents an integer of 1-10.

Also, $R^{71}$, $R^{72}$ and $R^{73}$ each represent a halogen atom, a C1-10 alkyl group, a C2-20 group with at least one unsaturated bond, a phenyl group, or a phenyl group having at least one hydrogen substituted with a halogen atom, a C1-10 alkyl group or a C2-20 group with at least one unsaturated bond, v represents an integer of 1-5, w represents an integer of 1-3, x represents an integer of 1-4, and $R^{71}$, $R^{72}$ and $R^{73}$ may be the same or different from each other, or amongst themselves if v, w or x is 2 or greater.

Also, $R^{74}$ represents hydrogen or methyl, $R^{75}$ represents hydrogen, a C1-10 alkyl group, a halogen atom, an alkoxy group or phenyl, $R^{76}$ represents a C1-10 straight-chain, branched or cyclic alkylene group, y represents an integer of 0-4, z represents an integer of 1-5 and y+z represents an integer of 1-5.

Table 1 shows suitable combinations of $R^3$ and $R^4$ for the phosphonic acid monoester compounds represented by general formula (6) above.

TABLE 1

| | $R^3$ | $R^4$ |
|---|---|---|
| 1 | (methoxy-isopropyl group) | $CH_2CH_3$ |
| 2 | (2-ethylhexyl group) | (2-ethylhexyl group) |
| 3 | (methoxy-isopropyl group) | $CH_3$ |
| 4 | (methoxy-isopropyl group) | $CH(CH_3)CH_3$ |
| 5 | (methoxy-isopropyl group) | $CH_2CH_2CH_2CH_3$ |

Table 2 shows suitable combinations of $R^5$ and $R^6$ for the phosphinic acid compounds represented by general formula (7) above.

TABLE 2

| | $R^5$ | $R^6$ |
|---|---|---|
| 1 | (2-ethylhexyl group) | (2-ethylhexyl group) |
| 2 | (neopentyl-type group) | (neopentyl-type group) |
| 3 | $CH_3$ | $CH_3$ |
| 4 | Ph | Ph |
| 5 | (4-methoxyphenyl group) | (4-methoxyphenyl group) |
| 6 | (HOOC-alkyl group) | Ph |

Tables 3-15 show suitable combinations of $R^7$ and $R^8$ for the phosphoric acid ester compounds represented by general formula (8) above. As suitable groups for $R^9$ in the phosphoric acid ester compounds represented by general formula (9) above there may be mentioned the same groups as for $R^8$.

TABLE 3

| | $R^7$ | $R^8$ |
|---|---|---|
| 1 | (2-ethylhexyl group) | (2-ethylhexyl group) |
| 2 | $[-(CH_2)_{10}-]$ | $[-(CH_2)_{10}-]$ |
| 3 | $[-(CH_2)_6-CH=CH-(CH_2)_6-]$ | $[-(CH_2)_6-CH=CH-(CH_2)_6-]$ |
| 4 | $[-(CH_2)_{16}-]$ | $[-(CH_2)_{16}-]$ |
| 5 | Ph | Ph |
| 6 | (3-chlorophenyl) | (3-chlorophenyl) |
| 7 | (4-chlorophenyl) | (4-chlorophenyl) |

TABLE 4

| | $R^7$ | $R^8$ |
|---|---|---|
| 1 | (2-fluorophenyl) | (2-fluorophenyl) |
| 2 | (4-fluorophenyl) | (4-fluorophenyl) |
| 3 | (2-acryloylphenyl) | (2-acryloylphenyl) |
| 4 | (3-acryloylphenyl) | (3-acryloylphenyl) |
| 5 | (4-acryloylphenyl) | (4-acryloylphenyl) |

TABLE 4-continued and Tables 5-8 contain chemical structures for R⁷ and R⁸ substituents that cannot be faithfully represented in text form.

TABLE 8-continued
| | R⁷ | R⁸ |
|---|---|---|
| 5 | 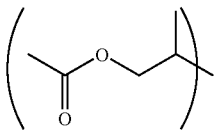 | 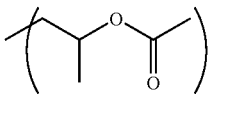 |
TABLE 9
| | R⁷ | R⁸ |
|---|---|---|
| 1 | 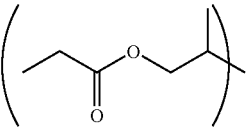 | 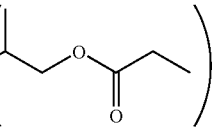 |
| 2 | 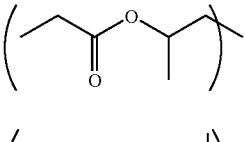 | 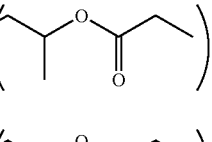 |
| 3 | 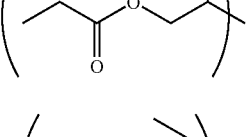 | 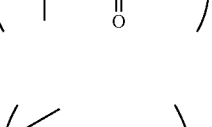 |
| 4 | 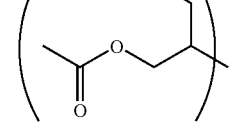 | 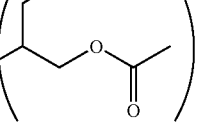 |
| 5 | 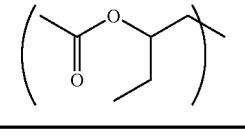 | 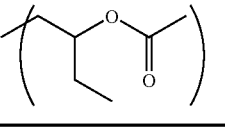 |
TABLE 10
| | R⁷ | R⁸ |
|---|---|---|
| 1 | 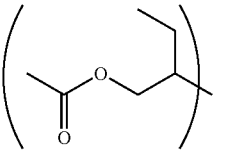 | 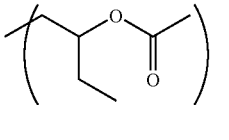 |
| 2 | 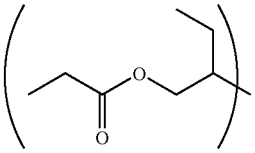 | 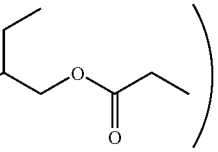 |
TABLE 10-continued
| | R⁷ | R⁸ |
|---|---|---|
| 3 | 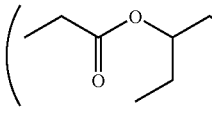 | 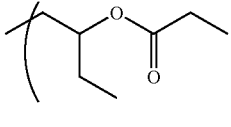 |
| 4 | 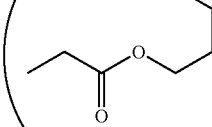 | 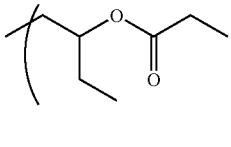 |
| 5 | 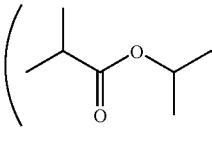 | 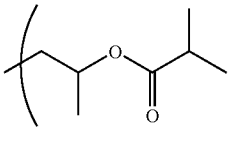 |
TABLE 11
| | R⁷ | R⁸ |
|---|---|---|
| 1 | 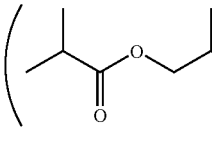 | 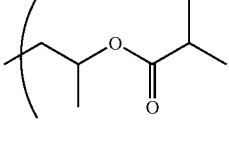 |
| 2 | 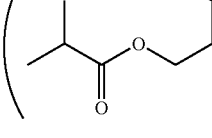 | 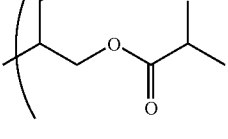 |
| 3 | 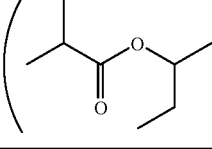 | 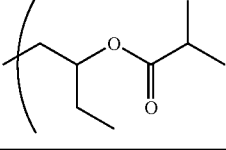 |
| 4 | 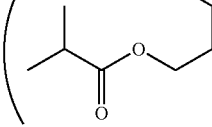 | 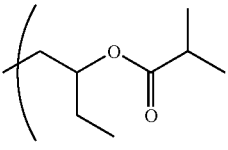 |
TABLE 12
| | R⁷ | R⁸ |
|---|---|---|
| 1 | | |

TABLE 12-continued

| | R⁷ | R⁸ |
|---|---|---|
| 2 | (structure) | (structure) |
| 3 | (structure) | (structure) |
| 4 | (structure) | (structure) |
| 5 | (structure) | (structure) |

TABLE 13

| | R⁷ | R⁸ |
|---|---|---|
| 1 | (structure) | (structure) |
| 2 | (structure) | (structure) |
| 3 | (structure) | (structure) |
| 4 | (structure) | (structure) |
| 5 | (structure) | (structure) |

TABLE 14

| | R⁷ | R⁸ |
|---|---|---|
| 1 | (structure) | (structure) |
| 2 | (structure) | (structure) |
| 3 | (structure) | (structure) |
| 4 | (structure) | (structure) |
| 5 | (structure) | (structure) |

TABLE 15

| | R⁷ | R⁸ |
|---|---|---|
| 1 | (structure) | (structure) |
| 2 | (structure) | (structure) |
| 3 | (structure) | (structure) |

Table 16 shows suitable groups for $R^{10}$ in the phosphonic acid compounds represented by general formula (10) above.

TABLE 16

| | R¹⁰ |
|---|---|
| 1 | (structure) |
| 2 | $CH_2CH_3$ |
| 3 | $(CH_2)_9CH_3$ |
| 4 | $CH=CH_2$ |
| 5 | Ph |

TABLE 16-continued

| | R$^{10}$ |
|---|---|
| 6 | 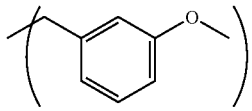 |
| 7 | 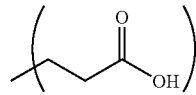 |
| 8 | CH$_3$ |
| 9 | C(CH$_3$)$_3$ |
| 10 | (CH$_2$)$_3$Br |
| 11 | 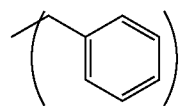 |
| 12 | 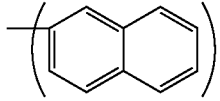 |

The resin used is one with excellent transparency, and as examples there may be mentioned vinyl chloride resins, acryl resins, polycarbonate resins, polyester resins, polyolefin resins, norbornane resins, polyurethane resins, polyvinylacetal resins, ethylene-vinyl acetate copolymers and their partially saponified forms. These synthetic resins may be used alone or in combinations of two or more. Preferred among these are one or more selected from among polyvinylacetal resins, ethylene-vinyl acetate-based copolymers and their partially saponified forms, which have high adhesion for translucent materials such as glass or plastic, and polyvinylacetal resins are especially preferred from the viewpoint of obtaining a sufficient ameliorating effect on the translucency through improved solubility or dispersibility of the copper-containing phosphorus compound. A polyvinylacetal resin is a resin obtained by aldehyde reaction of polyvinyl alcohol for acetalation, and the term includes both partially acetalated and mostly (or completely) acetalated resins. As examples of such polyvinylacetal resins there may be mentioned polyvinyl formal resin (vinylon) and polyvinylbutyral resin.

Polyvinylbutyral resin is preferred as a polyvinylacetal resin. Using a polyvinylbutyral resin results in excellent transparency, weather resistance and glass adhesion of the obtained interlayer film.

Depending on the required properties, the polyvinylacetal resin may be a blend in an appropriate combination, or it may be a polyvinylacetal resin obtained by acetalation with a combination of aldehydes during the acetalation. There are no particular restrictions on the molecular weight, molecular weight distribution and acetalation degree of the polyvinylacetal, but preferably the acetalation degree is 40-85%, and more preferably the lower limit is 60% and the upper limit is 75%.

The polyvinylacetal resin may be obtained by acetalation of a polyvinyl alcohol resin with an aldehyde. A polyvinyl alcohol resin is usually obtained by saponification of polyvinyl acetate, and generally a polyvinyl alcohol resin with a saponification degree of 80-99.8 mole percent is used. The viscosity average polymerization degree of the polyvinyl alcohol resin is preferably between 200 and 3000. If the average polymerization degree is less than 200, the penetration resistance of the obtained laminated glass will tend to be reduced. On the other hand, if it exceeds 3000 the moldability of the resin film will tend to be impaired, the rigidity of the resin film will be too great and the workability will tend to be poor. From this viewpoint, therefore, the average polymerization degree is preferably between 500 and 2000. The viscosity average polymerization degree and saponification degree of the polyvinyl alcohol resin may be measured, for example, based on JIS K 6726, "Polyvinyl Alcohol Test Method".

There are no particular restrictions on the aldehyde, and there may be mentioned as examples C1-10 aldehydes, and as more specific examples n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde and benzaldehyde. Preferred among these are n-butylaldehyde, n-hexylaldehyde and n-valeraldehyde. Butylaldehyde with 4 carbon atoms is particularly preferred.

The content ratio (weight ratio) of the solubilizing agent and copper-containing phosphorus compound is preferably 95/5-10/90 (former/latter, same hereunder), more preferably 90/10-20/80 and even more preferably 85/15-30/70. If the content ratio is less than 10/90 it may be difficult to impart sufficient solubility or dispersibility in resins for the copper-containing phosphorus compound, while if the content ratio is greater than 95/5, no improving effect on the solubility or dispersibility in resins commensurate with the increased content may be expected, and it may be economically disadvantageous.

When the composition is a resin composition containing a resin, the content of the solubilizing agent in the resin composition is preferably 1-60 wt %, more preferably 3-50 wt %, and even more preferably 5-40 wt % with respect to 100 parts by weight of the resin. If the solubilizing agent content is less than 1 wt % the dissolution and dispersion of the copper-containing phosphorus compound in the resin may become difficult, while if the content is greater than 60 wt % the solubilizing agent may bleed out. The content of the copper-containing phosphorus compound in the resin composition is preferably 0.5-45 wt %, more preferably 1-35 wt %, and even more preferably 2-30 wt % with respect to 100 parts by weight of the resin. If the content of the copper-containing phosphorus compound is less than 0.5 wt % the infrared-absorbing performance may be insufficient, while if the content is greater than 45 wt % it may be difficult to achieve uniform dissolution or dispersion of the copper-containing phosphorus compound in the resin.

The composition may also contain components other than those mentioned above. Examples of such other components include adhesive force adjustors. As examples of adhesive force adjustors there may be mentioned alkali metal salts or alkaline earth metal salts of organic acids or inorganic acids, and modified silicone oils. There are no particular restrictions on organic acids, and as examples there may be mentioned carboxylic acids such as octanoic acid, hexanoic acid, butyric acid, acetic acid, formic acid and the like. There are also no particular restrictions on inorganic acids, and as examples there may be mentioned hydrochloric acid, nitric acid and the like. There are likewise no particular restrictions on alkali metal salts and alkaline earth metal salts, and as examples there may be mentioned salts of potassium, sodium, calcium, magnesium and the like.

Among these alkali metal salts and alkaline earth metal salts there are preferred alkali metal salts or alkaline earth metal salts of C2-16 organic acids, and there are especially preferred potassium or magnesium salts of C2-16 carboxylic acids.

Preferred examples of potassium or magnesium salts of C2-16 carboxylic acids include magnesium acetate, potassium acetate, magnesium propionate, potassium propionate, magnesium 2-ethylbutanoate, potassium 2-ethylbutanoate, magnesium 2-ethylhexanoate, potassium 2-ethylhexanoate and the like. These may be used alone or in combinations of two or more.

The preferred lower limit for the content of an alkali metal salt or alkaline earth metal salt of an organic acid or inorganic acid is 0.001 part by weight and the preferred upper limit is 0.5 part by weight with respect to 100 parts by weight of the resin. If the content of the alkali metal salt or alkaline earth metal salt is less than 0.001 part by weight, the adhesive force around the perimeter may be reduced in high-humidity environments. On the other hand, if it is greater than 0.5 part by weight, the transparency of the film may be lost. The preferred lower limit for this content is 0.01 part by weight and the preferred upper limit is 0.2 part by weight.

As examples of modified silicone oils there may be mentioned epoxy-modified silicone oils, ether-modified silicone oils, ester-modified silicone oils, amine-modified silicone oils and carboxyl-modified silicone oils. These may be used alone or in combinations of two or more. These modified silicone oils can generally be obtained by reacting polysiloxane with the compound to be modified.

The preferred lower limit for the molecular weight of the modified silicone oil is 800, and the preferred upper limit is 5000. If the molecular weight of the modified silicone oil is less than 800, localization of the modified silicone oil on the surface may be insufficient and a satisfactory adhesive force-improving effect may not be achieved. On the other hand, if it exceeds 5000 the compatibility with the resin may be reduced, possibly causing bleed out on the film surface and reducing the adhesive force with glass. From this viewpoint, therefore, the molecular weight is more preferably between 1500 and 4000.

The preferred lower limit for the content of the modified silicone oil is 0.01 part by weight and the preferred upper limit is 0.2 part by weight with respect to 100 parts by weight of the resin. If the content is less than 0.01 part by weight, the effect of preventing moisture absorption-induced whitening may be inadequate. On the other hand, if it exceeds 0.2 part by weight, compatibility with the resin may be reduced, possibly resulting in bleed out on the film surface and reduced adhesive force between the resin and glass. From this standpoint, more preferably the lower limit for the content of the modified silicone oil is 0.03 part by weight and the upper limit is 0.1 part by weight.

The composition described above may further contain components other than those mentioned, for the purpose of improving the properties for use as an interlayer film in laminated glass.

As such other components there may be mentioned, first, ultraviolet absorbers. As ultraviolet absorbers there may be mentioned benzoate-based compounds, salicylate-based compounds, benzophenone-based compounds, benzotriazole-based compounds, cyano acrylate-based compounds, oxalic acid anilide-based compounds and triazine-based compounds.

More specifically, as a benzoate-based compound there may be mentioned 2,4-di-t-butylphenyl-3',5'-di-t-butyl-4'-hydroxybenzoate, and as salicylate-based compounds there may be mentioned phenyl salicylate and p-t-butylphenyl salicylate.

As benzophenone-based compounds there may be mentioned 2,4-di-hydroxybenzophenone, 2-hydroxy-4-methoxybenzophenone, 2-hydroxy-4-methoxybenzophenone-5-sulfonoic acid, 2-hydroxy-4-n-octyloxybenzophenone, 2-hydroxy-4-n-dodecyloxybenzophenone, 2,2',4,4'-tetrahydrobenzophenone, bis(5-benzoyl-4-hydroxy-2-methoxyphenyl)methane, 2,2'-dihydroxy-4,4'-dimethoxybenzophenone, 2,2'-dihydroxy-4,4'-dimethoxybenzophenone-5,5'-disulfonoic acid sodium, 2,2'-dihydroxy-5-methoxybenzophenone, 2-hydroxy-4-methacryloyloxyethylbenzophenone, 4-benzoyloxy-2-hydroxybenzophenone and 2,2',4,4'-tetrahydroxybenzophenone, As benzotriazole-based compounds there may be mentioned 2-(2'-hydroxy-5'-methylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-butylphenyl)benzotriazole, 2-(2'-hydroxy-5-t-octylphenyl)benzotriazole, 2-(2'-hydroxy-5-t-butylphenyl)benzotriazole, 2-[2'-hydroxy-3'-(3",4",5",6"-tetrahydrophthalimidemethyl)-5'-methylphenyl]benzotriazole, 2-(2'-hydroxy-3',5'-di-t-amylphenyl)benzotriazole, 2-(2'-hydroxy-5-t-octylphenyl)benzotriazole, 2-[2'-hydroxy-3',5'-bis($\alpha,\alpha$-dimethoxybenzoyl)phenyl]benzotriazole, 2,2'-methylenebis[4-(1,1,3,3-tetramethylbutyl)-6-(2N-benzotriazol-2-yl)phenol], 2-(2'-hydroxy-5'-methacryloyloxyethylphenyl)-2H-benzotriazole, 2-(2'-hydroxy-3'-dodecyl-5'-methylphenyl)benzotriazole and condensates of polyethylene glycol with methyl-3-[3-t-butyl-5-(2H-benzotriazol-2-yl)-4-hydroxyphenyl]propionate.

As cyano acrylate-based compounds there may be mentioned ethyl-2-cyano-3,3-diphenyl acrylate and octyl-2-cyano-3,3-diphenyl acrylate, and as oxalic acid anilide-based compounds there may be mentioned 2-ethoxy-2'-ethyloxalic acid bisanilide and 2-ethoxy-5-t-butyl-2'-ethyloxalic acid bisanilide. As a triazine-based compound there may be mentioned 2-(4,6-diphenyl-1,3,5-triazin-2-yl)-5-[(hexyl)oxy]-phenol.

The composition may further contain a light stabilizer for more improved stability against light. Using the aforementioned ultraviolet absorber in combination with a light stabilizer will tend to yield highly satisfactory stability against light. As light stabilizers there may be used hindered amine light stabilizers (HALS) and Ni-based compounds.

More specifically, as HALS there may be mentioned bis(2,2,6,6-tetramethyl-4-piperidyl)sebacate, bis(1,2,2,6,6-pentamethyl-4-piperidyl)sebacate, 1-[2-[3-(3,5-t-butyl-4-hydroxyphenyl)propionyloxy]ethyl]-4-[3-(3,5-di-t-butyl-4-hydroxyphenyl)propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4,5]decane-2,4-dione, bis-(1,2,2,6,6-pentamethyl-4-piperidyl)-2-(3,5-di-t-butyl-4-hydroxybenzyl)-2-n-butyl malonate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylate, (Mixed 1,2,2,6,6-pentamethyl-4-piperidyl/tridecyl)-1,2,3,4-butanetetracarboxylate, Mixed {1,2,2,6,6-pentamethyl-4-piperidyl/β,β,β',β'-tetramethyl-3,9-[2,4,8,10-tetraoxaspiro(5,5)undecane]diethyl}-1,2,3,4-butanetetracarboxylate, (Mixed 2,2,6,6-tetramethyl-4-piperidyl/tridecyl)-1,2,3,4-butanetetracarboxylate, Mixed {2,2,6,6-tetramethyl-4-piperidyl/β,β,β',β'-tetramethyl-3,9-[2,4,8,10-tetraoxaspiro(5,5)undecane]diethyl}-1,2,3,4-butanetetracarboxylate, 2,2,6,6-tetramethyl-4-piperidyl methacrylate, 1,2,2,6,6-pentamethyl-4-piperidyl methacrylate, poly[(6-(1,1,3,3-tetramethylbutyl)imino-1,3,5-triazine-2,4-diyl)][(2,2,6,6-tetramethyl-4-piperidyl)imino]hexamethylene[(2,2,6,6-tetramethyl-4-piperidyl)iminol], dimethylsuccinate polymer-with-4-hydroxy-2,2,6,6-tetramethyl-1-piperidineethanol, N,N',N'',N'''-tetrakis-(4,6-bis-(butyl-(N-methyl-2,2,6,6-tetramethylpiperidin-4-yl)amino)-triazin-2-yl)-4,7-diazadecane-1,10-diamine, polycondensate of dibutylamine-1,3,5-triazine-N,N'-bis(2,2,6,6-tetramethyl-4-piperidyl-1,6-hexaamethylenediamine and N-(2,2,6,6-tetramethylpiperidyl)butylamine, decanedioic acid bis(2,2,6,6-tetramethyl-1-(octyloxy)-4-piperidinyl)ester, and the like.

As Ni-based light stabilizers there may be mentioned [2,2'-thio-bis(4-t-octylphenolate)]-2-ethylhexylamine-nickel (II), nickel dibutyldithiocarbonate, [2,2'-thio-bis(4-t-octylphenolate)]-butylamine-nickel (II), and the like.

If necessary, the composition may contain additives such as antioxidants to prevent heat-induced degradation in the extruder, dyes and pigments for color matching, surfactants, flame retardants, antistatic agents, moistureproof agents. Also, the composition may contain other compounds commonly used as plasticizers for resin compositions, in addition to the aforementioned solubilizing agent. A composition containing such a plasticizer can form an interlayer film for laminated glass that exhibits even more excellent translucency.

(Optical Member)

Optical members are obtained using optical components composed of the aforementioned composition, and the following three modes are preferred.

First mode: Optical member formed of an optical component.

Second mode: Optical member comprising an optical component laminated on a transparent base made of a translucent material such as glass or plastic.

Third mode: Optical member having a layer made of an optical component formed on a transparent base made of a translucent material such as glass or plastic.

Examples of optical members according to the first mode include sheets and films. A sheet is a thin form having a thickness of 250 μm or greater. A film is a thin membranous form with a thickness of 5-250 μm. The means used for fabrication of a sheet or film may be, for example, a melt extrusion molding method, a draw molding method, a calender molding method, a press molding method or a solution casting method. However, there is no limitation to these methods.

As examples of optical members according to the second mode there may be mentioned members obtained by using the aforementioned sheet or film as the interlayer film of laminated glass, for example, and laminating the laminated glass interlayer film with a translucent material made of glass, plastic or the like. The means for bonding the laminated glass interlayer film consisting of a sheet or film with a translucent material may be means of bonding under pressure or under reduced pressure, such as a press method, multiroll method, reduced pressure method or the like, means of bonding by heat using an autoclave or the like, or a combination of such means.

The laminated glass interlayer film preferably has a thickness of 0.001-10 mm, and especially 0.01-5 mm. If the laminated glass interlayer film thickness is less than 0.001 mm, it may be difficult to obtain an interlayer film with high absorption for light of specific wavelengths, possibly resulting in unsatisfactory infrared-absorbing performance. On the other hand, if the laminated glass interlayer film thickness is greater than 10 mm, it may be difficult to obtain an interlayer film with high transmittance for visible light rays, resulting in low transparency.

Examples of optical members according to the third mode include coatings. Here, a coating is a thin-film, covering or thin-layer obtained by applying a solution or dispersion of the composition or resin composition in a suitable solvent onto a given surface, and evaporating the solvent to accomplish formation on all or part of the surface. For increased flatness of the surface onto which the thin-film, etc. is formed, for example, dissolving aids such as surfactants may be added to the solution or dispersion to serve as leveling agents or antifoaming agents.

Because optical members according to these first to third modes have satisfactory solubility or dispersibility of the copper-containing phosphorus compound due to the presence of the solubilizing agent, they exhibit excellent translucency, while having superior infrared-absorbing properties due to the presence of copper. When a polyvinylacetal resin, and particularly polyvinylbutyral resin is used as the resin component, it is possible to achieve uniform dissolution or dispersion of the copper-containing phosphorus compound in the resin due to the solubilizing agent, thereby allowing excellent translucency and adhesion with translucent materials to be achieved. Also, since polyvinylacetal resins are thermoplastic they allow the molding process to be carried out more conveniently.

The method used to fabricate laminated glass may be a method of inserting an interlayer film made of a adhesive thermoplastic resin between two glass panels, subjecting the laminate to preliminary contact bonding to eliminate residual air between the layers, and then performing main contact bonding for complete bonding of the laminate. The interlayer film used in this case must produce no blocking phenomenon whereby the interlayer film coalesces into lumps during storage, it must be satisfactorily workable during lamination of glass with the interlayer film, and it must have a satisfactory deairing property in the preliminary contact bonding step. The deairing property in the preliminary contact bonding will determine the quality of the laminated glass, as insufficient deairing will result in laminated glass with poor transparency, and air bubbles may be produced in an accelerated test.

The overall performance of this type of interlayer film is governed by the type of thermoplastic resin used as the material and its physical properties such as viscoelasticity, but if these are constant it is the surface shape of the interlayer film that is the main determinant of the overall performance. In particular, it is common in the prior art to form numerous fine irregularities known as embossing on the surfaces of interlayer films. The form of embossing may be, for example, various types of irregularity patterns consisting of numerous hills and numerous valleys between the hills, various types of irregularity patterns consisting of numerous raised areas and numerous grooves between the raised areas, or embossed shapes having different values for the different shape-determining factors such as roughness, positioning and size.

As examples of methods of embossing there may be mentioned a method of altering the sizes of the hills and specifying the sizes and orientation thereof as described in Japanese Unexamined Patent Publication HEI No. 6-198809, a method of adjusting the surface roughness to 20-50 μm as described in Japanese Unexamined Patent Publication HEI No. 9-40444, a method of orienting raised areas in a crossing fashion as described in Japanese Unexamined Patent Publication HEI No. 9-295839, and a method of forming additional small hills on primary hills as described in Japanese Unexamined Patent Publication No. 2003-48762. As methods of creating embossed shapes there have been proposed a method of utilizing melt fracture produced during resin molding as in Japanese Patent Public Inspection No. 2003-528749, and methods of using crosslinked PVB particles or nucleating agents as in Japanese Patent Public Inspection No. 2002-505211 and Japanese Patent Public Inspection HEI No. 9-502755.

Depending on the purpose of use, the laminated glass may require a sound insulating property. Sound insulating performance is generally represented as transmission loss in response to change in frequency, where the transmission loss is specified as fixed values for the sound insulation rating at 500 Hz and above according to JIS A 4708. However, the sound insulating performance of a glass panel is significantly lowered by a coincidence effect in the frequency range centered around 2000 Hz.

The coincidence effect is a phenomenon where, upon incidence of sound waves onto the glass panel, transverse waves are propagated on the glass panel in a manner dependent on the rigidity and inertia of the glass panel, and the transverse waves resonate with the incident sound, resulting in transmission of the sound. In ordinary laminated glass, the reduction in sound insulating performance due to the coincidence effect cannot be avoided in a frequency range centered around 2000 Hz, and therefore improvement in this aspect is often desired.

On the other hand, it is known that the human auditory sense is highly sensitive in a range of 1000-6000 Hz compared to other frequency ranges, as represented by equal-loudness contours. Thus, eliminating breakdown of sound insulating performance due to the coincidence effect is clearly important for achieving increased soundproof performance. In order to increase the sound insulating performance of laminated glass, therefore, it is necessary to mitigate the reduction in sound insulating performance due to the coincidence effect, and prevent reduction in local areas of transmission loss (the local areas of transmission loss will hereinafter be abbreviated as TL) resulting from the coincidence effect.

The method for conferring a sound insulating property to the laminated glass may be a method of increasing the mass of the laminated glass, a method of compositing the glass, a method of fragmenting the glass area or a method of improving the glass panel support means.

Since the sound insulating performance is also affected by the dynamic viscoelasticity of the interlayer film, and in particular is affected by the loss tangent which is the ratio between the storage elastic modulus and the loss elastic modulus, this value can be controlled to increase the sound insulating performance of the laminated glass.

As examples of control means there may be mentioned a method using a resin film with a specified degree of polymerization, a method of specifying the structure of the acetal portion of the polyvinylacetal resin as described in Japanese Unexamined Patent Publication HEI No. 4-2317443, or a method of specifying the amount of plasticizer in the resin as described in Japanese Unexamined Patent Publication No. 2001-220183. In addition, two or more different resins may be combined to increase the sound insulating performance of the laminated glass across a wide temperature range. For example, there may be mentioned the method of blending multiple resins described in Japanese Unexamined Patent Publication No. 2001-206742, the methods of laminating multiple resins described in Japanese Unexamined Patent Publication No. 2001-206741 and Japanese Unexamined Patent Publication No. 2001-226152, and the method of producing deviations in the amount of plasticizer in the interlayer film, as described in Japanese Unexamined Patent Publication No. 2001-192243.

Also, as a method of increasing the heat-insulating property of the laminated glass, metal or metal oxide fine particles having a heat-insulating function can be added to the interlayer film, or a layer containing them may be introduced into the laminate structure of the laminated glass. For example, there may be mentioned the methods described in Japanese Unexamined Patent Publication No. 2001-206743, Japanese Unexamined Patent Publication No. 2001-261383 and Japanese Unexamined Patent Publication No. 2001-302289. As oxide fine particles there may be mentioned tin-doped indium oxide (ITO), antimony-doped tin oxide (ATO) and aluminum-doped zinc oxide (AZO). In order to increase the translucency of the interlayer film there may be employed a method of reducing the particle sizes of the oxide fine particles (Japanese Patent Publication No. 271589, Japanese Unexamined Patent Publication No. 2002-293583), or increasing the degree of dispersion thereof. The degree of dispersion of the fine particles can be increased by a known fine particle dispersion technique involving mechanical dispersion or the use of a dispersing agent. As an alternative to metal or metal oxide fine particles, there may be mentioned a method of using an organic dye/pigment with a heat-insulating function as described in Japanese Unexamined Patent Publication HEI No. 7-157344 and Japanese Patent Publication No. 319271. As organic dyes/pigments with heat-insulating functions there may be mentioned phthalocyanine-based, anthraquinone-based, naphthoquinone-based, cyanine-based, naphthalocyanine-based, pyrrole-based, imonium-based, dithiol-based and mercaptonaphthol-based dyes and pigments.

The method of increasing the heat-insulating property of the laminated glass may also be a method of fabricating the laminated glass using glass with a heat-insulating function. For example, there may be mentioned a method of using glass containing a transition metal such as Fe (for example, green glass) as described in Japanese Unexamined Patent Publication No. 2001-151539 and methods of using a metal- or metal oxide-laminated (multilayer-coated) glass panel as described in Japanese Unexamined Patent Publication No. 2001-261384 and Japanese Unexamined Patent Publication No. 2001-226148.

The laminated glass may further include a layer with an infrared light-reflecting property (infrared light-reflective layer) in addition to the aforementioned interlayer film with an infrared light-absorbing property, for the purpose of further improving the infrared light-blocking property. Such an infrared light-reflective layer can be introduced at any position of the laminated structure of the laminated glass.

A transparent layer composed of a metal or metal oxide may be applied as the infrared light-reflective layer. Specific examples include layers of simple metals such as gold, silver, copper, tin, aluminum, nickel, palladium, silicon, chromium, titanium, indium and antimony, as well as their alloys, mixtures or oxides. The infrared light-reflective layer can be formed by vapor deposition of a metal or metal oxide on the layer over which this layer is to be formed.

As infrared light-reflective layers there may be used macromolecular multilayer films that reflect specific wavelengths by light interference, such as disclosed in Japanese Patent Public Inspection HEI No. 09-506837, Japanese Patent Public Inspection No. 2000-506082, Japanese Patent Public Inspection No. 2000-506084, Japanese Patent Public Inspection No. 2004-525403, Japanese Patent Public Inspection No. 2003-515754, Japanese Unexamined Patent Publication No. 2002-231038 and Japanese Patent Public Inspection No. 2004-503402.

Incidentally, if the aforementioned infrared light-reflective layer is introduced in the laminated glass, adhesion between the infrared light-absorbing layer and its adjacent layer is sometimes altered and may tend to cause peeling between them. When this occurs, for example if an infrared light-reflective layer has been formed between the base and interlayer film, damage to the laminated glass can cause detachment and fly-off of the base, thus creating a problem in terms of safety. Thus, in order to avoid altering the adhesion, it is preferred to employ suitable means for adjusting the adhesive force between the infrared light-reflective layer and the layer adjacent to the reflective layer.

The following may be mentioned as examples of means for adjusting the adhesive force. Specifically, there may be mentioned as an example a method of forming a layer composed of a polyvinylacetal with a higher acetalation degree than the infrared light-absorbing layer between the infrared light-reflective layer and the layer adjacent thereto (interlayer film, etc.) (Japanese Unexamined Patent Publication HEI No. 7-187726, Japanese Unexamined Patent Publication HEI No. 8-337446). There may also be mentioned a method of forming a layer composed of PVB having a prescribed proportion of acetoxy groups (Japanese Unexamined Patent Publication HEI No. 8-337445) or a method of forming a layer composed of a prescribed silicone oil (Japanese Unexamined Patent Publication HEI No. 7-314609) between the infrared light-reflective layer and the layer adjacent thereto.

Thus, by forming an infrared light-reflective layer in addition to the infrared light-absorbing interlayer film in the laminated glass, it is possible to impart a more excellent infrared light-blocking property to the laminated glass, due to the effects of both layers. Furthermore, by applying a method of adjusting the adhesion with the infrared light-absorbing layer as explained above, it is possible to obtain laminated glass with yet superior strength.

In order to increase the performance as an interlayer film, the following methods may also be applied. As examples of methods of improving penetration resistance there may be mentioned a method of using an α-olefin modified polyvinylacetal as the resin base material as described in Japanese Examined Patent Publication HEI No. 6-25005, a method of specifying the resin polymerization degree and plasticizer addition amount as described in Japanese Unexamined Patent Publication HEI No. 10-25390, and a method of reducing the thickness variation of the interlayer film as described in Japanese Unexamined Patent Publication HEI No. 11-147736.

As methods of adjusting the adhesive and cohesive properties between the interlayer film and glass there may be mentioned a method of radiation grafting desaturation of the resin as described in Japanese Patent Publication No. 2624779, a method of adding a silicone oil as described in Japanese Unexamined Patent Publication HEI No. 11-322378, a method of adding an alkali metal or alkaline earth metal as described in Japanese Unexamined Patent Publication No. 2000-1238586, and a method of adding a surface energy modifier as described in Japanese Unexamined Patent Publication No. 2002-505210.

As methods of preventing whitening in durability testing there may be mentioned, for example, a method of adding a silicone oil having hydrocarbon groups with high hydrophobicity in the molecule, as described in Japanese Unexamined Patent Publication No. 2000-72495, a method of specifying the amount of addition of an alkali metal or alkaline earth metal as described in Japanese Unexamined Patent Publication No. 2000-128586, a method of specifying the oxyalkyleneglycol content as described in Japanese Unexamined Patent Publication No. 2001-139352, a method of using a resin with specified properties as described in Japanese Unexamined Patent Publication No. 2001-163640, and a method of sealing with a silane coupling agent as described in Japanese Unexamined Patent Publication HEI No. 6-211548.

As methods of improving ultraviolet absorption properties there may be mentioned methods of adding ultraviolet absorbers as described in Japanese Examined Patent Publication HEI No. 4-29697, Japanese Unexamined Patent Publication HEI No. 10-194796 and Japanese Unexamined Patent Publication No. 2000-128587. As antistatic methods there may be mentioned a method of adding a carboxylic acid alkali metal salt as described in Japanese Unexamined Patent Publication No. 2001-240425, and a method of adding an oxyalkylene compound as described in Japanese Unexamined Patent Publication No. 2001-261384. As a color matching method there may be mentioned the method of adding a dye described in Japanese Unexamined Patent Publication HEI No. 9-183638.

For an optical member with excellent translucency, the haze of the optical member is preferably no greater than 50%, more preferably no greater than 35% and even more preferably no greater than 25%. If the haze exceeds 50%, the translucency (visible light ray transmittance) will tend to be insufficient.

FIG. 1 is a schematic cross-sectional view of an example of an optical member according to this mode. The optical member shown in FIG. 1 is a window material 10. The window material 10 is provided with an infrared-absorbing composition layer 2 on a flat base material 1 made of a translucent material such as glass or plastic. The infrared-absorbing resin composition layer 2 is composed of an optical material made of the aforementioned resin composition.

The material used to form the flat base material 1 is not particularly limited so long as it is a translucent material having a visible light transmitting property, and it may be appropriately selected depending on the purpose of the window material. From the standpoint of hardness, heat resistance, chemical resistance and durability, it is preferred to use glass or plastic as explained above. Glass includes inorganic glass and organic glass. Plastic includes, for example, polycarbonate, acrylonitrile-styrene copolymer, polymethyl methacrylate, vinyl chloride resins, polystyrene, polyester, polyolefin, norbornene resins and the like. When a plurality of flat base materials 1 are present, they may all be composed of the same type of material, or they may each be composed of different materials.

The infrared-absorbing composition layer 2 may be prepared using means for mixing the resin composition such as a Henschel mixer or other mixer, or kneading and mixing means such as a roll kneader or kneading extruder. There may be used, alternatively, means for dispersing each component in an appropriate organic solvent and removing the organic solvent from the dispersion.

When light including a heat ray component such as sunlight falls on a window material 10 having such a construction, the heat ray absorption exhibited by the infrared-absorbing composition layer 2 blocks heat rays of the heat ray component especially in the near-infrared light region (a wavelength of about 700-1200 nm). Generally speaking, heat rays (near-infrared rays) in this wavelength region tend to gradually produce an irritating hot burning feel on the skin, but since light passing through the window material 10 consists primarily of visible light rays which hardly contain heat ray component, it is possible to minimize increase in the temperature inside rooms and home interiors.

Sunlight, in particular, has a continuous wavelength spectrum with a single peak for the visible light component when considered macroscopically, and its heat ray component comprises more near-infrared light than infrared light. Thus, the window material 10 provided with an infrared-absorbing composition layer 2 exhibiting an excellent near-infrared light-absorbing property may be effectively used for blockage of heat rays. Furthermore, the infrared-absorbing composition layer 2 absorbs the heat rays without reflecting them outward. Consequently, since the heat rays are not irradiated out of rooms or home interiors, this helps to prevent reflection and the related "heat island" phenomenon.

The material may therefore be implemented in building components that take natural light such as sunlight or other external light (without being limited to construction components), such as for example, window components for automobiles, ships, aircraft and electric (railroad) cars, canopy members for arcades and other passageways, curtains, carport or garage canopy members, sunroom window or wall components, show window or showcase window components, tents or their window components, blinds, fixed housing or temporary housing roof members, skylight or other window components, covering members for painted surfaces of road signs and the like, sun-shading gear such as parasols, and other members that must block heat rays.

Also, when the aforementioned metal oxide particles are dispersed in the infrared-absorbing composition layer 2, the infrared ray component is repeatedly scattered and reflected by the metal oxide particles, and is thereby attenuated and eventually disappears. Thus, blockage of heat rays can be even further improved.

The window component 10 may be suitably used as a single-layer glass window or its base material, as a single layer of a laminated glass window, or as one layer of a multilayer glass window. The window component 10 having the construction described above can be formed by application (by coating, for example) of the resin composition onto one main side of the base plate 1. Alternatively, it may be formed by attaching the aforementioned sheet or film onto one main side of the base plate 1.

The window component 10 shown in FIG. 1 has the infrared-absorbing composition layer 2 formed on one main side of the base plate 1, but it may also have an infrared-absorbing composition layer 2 formed on the other main side of the base plate 1. Another infrared-absorbing composition layer 2 may even be laminated over the infrared-absorbing composition layer 2 in the window component 10. A window component having such a construction can be suitably used as a single-layer glass window or its base material, as a single layer of a laminated glass window, or as one layer of a multilayer glass window, similar to the window component 10 described above.

There may also be mentioned window components obtained by integrally laminating in order an infrared-absorbing composition layer 2 and a base plate 1 on a base plate 1, window components obtained by integrally laminating in order an infrared-absorbing composition layer 2, infrared-absorbing composition layer 2 and base plate 1 on a base plate 1, and window components obtained by integrally laminating in order an infrared-absorbing composition layer 2, flat member 1 and infrared-absorbing composition layer 2 on a flat member 1, and these window components are preferred modes for laminated glass windows. In these modes of window components, the infrared-absorbing composition layer 2 functions as an interlayer film between two base plates 1 (for example, a laminated glass interlayer film).

The aforementioned infrared-absorbing composition layer 2 may also include an antiglare composition containing the aforementioned phosphorus compound and rare earth ion. By forming a window component with this construction, it is possible to provide an excellent antiglare property in addition to the excellent infrared-absorbing property and translucency.

The window component may also have a layer composed of an antiglare composition containing the aforementioned phosphorus compound and rare earth ion. For example, it may be a window component obtained by laminating in order an infrared-absorbing composition layer 2 and antiglare composition layer on a flat member 1, a window component obtained by laminating in order an antiglare composition layer and infrared-absorbing composition layer 2 on a flat member 1, or a window component obtained by laminating in order an infrared-absorbing composition layer 2, antiglare composition layer and infrared-absorbing composition layer 2 on a flat member 1.

EXAMPLES

The present invention will now be explained in further detail by examples and comparative examples, with the understanding that the invention is in no way limited by the examples.

Preparation of Copper-Containing Phosphorus Compound

Preparation Example 1

After dissolving 5.0 g of a mixture of mono(2-ethylhexyl) phosphate and di(2-ethylhexyl)phosphate in a ratio of 50:50 (molar ratio) (product of Tokyo Chemical Industry Co., Ltd.) in 15 g of toluene, 2.37 g of copper acetate monohydrate was added to the solution and the acetic acid was distilled off from the mixture while heating to reflux. The toluene was then distilled off from the obtained reaction mixture to obtain 6.04 g of a copper-containing phosphoric acid ester compound.

Preparation Example 2

After dissolving 200 g of triethyleneglycol mono-n-butyl ether in 200 g of toluene, the solution was cooled on ice. Next, 45.9 g of diphosphorus pentaoxide was added while keeping the temperature in the flask at 5° C. After prescribed stirring and heating to 100° C., the solvent of the obtained reaction mixture was distilled off under reduced pressure to obtain 245 g of n-butoxytriethyleneglycol phosphoric acid ester. The obtained phosphoric acid ester comprised a monoester component and diester component in a molar ratio of 50:50.

Next, 150 g of the obtained n-butoxytriethyleneglycol phosphoric acid ester was dissolved in 450 g of toluene, and then 57.5 g of copper acetate monohydrate was added to the solution and the mixture was heated to reflux while distilling off the acetic acid. The toluene was then distilled off from the obtained reaction mixture to obtain 159 g of a copper-containing phosphoric acid ester compound.

Preparation Example 3

After dissolving 10.0 g of 2-ethylhexyl-2-ethylhexyl phosphonate in 15 g of toluene, 3.29 g of copper acetate monohydrate was added to the solution and the mixture was heated to reflux while distilling off the acetic acid. The toluene was then distilled off from the obtained reaction mixture to obtain 11.2 g of a copper-containing phosphonic acid ester compound.

Production of Resin Composition

Example 1

A resin composition was obtained by mixing 1.2 g of the copper-containing phosphorus compound obtained in Preparation Example 1, 0.02 g of potassium acetate, 2.4 g of polyethyleneglycol #400 dimethacrylate (NK ESTER 9G, product of Shin-Nakamura Chemical Co., Ltd.) which is solubilizing agent and 8.4 g of a polyvinylbutyral resin (S-LEK BH-3, product of Sekisui Chemical Co., Ltd.).

(Fabrication of Sheet and Laminated Glass Employing It)

Next, the obtained resin composition was pressed several times at 85° C. using a press machine (WF-50, product of Shinto Metal Industries, Ltd.), subsequently pressed several times at 120° C., and then kneaded and molded to produce a 1.0 mm-thick sheet having a uniform surface.

The sheet obtained in this manner was then sandwiched between two glass slides (76 mm length×26 mm width×1.1 mm thickness) and subjected to contact bonding treatment for 30 minutes with an autoclave under conditions of 130° C. temperature, 1.2 MPa pressure, to fabricate laminated glass.

Example 2

A resin composition was obtained by the same method as Example 1, except that polyethyleneglycol #600 dimethacrylate (NK ESTER 14G, product of Shin-Nakamura Chemical Co., Ltd.) was used as the solubilizing agent. A sheet was then formed and laminated glass was obtained by the same method as Example 1.

Example 3

A resin composition was obtained by the same method as Example 1, except that diethyleneglycol dimethacrylate (NK ESTER 2G, product of Shin-Nakamura Chemical Co., Ltd.) was used as the solubilizing agent. A sheet was then formed and laminated glass was obtained by the same method as Example 1.

Example 4

A resin composition was obtained by the same method as Example 1, except that triethyleneglycol dimethacrylate (NK ESTER 3G, product of Shin-Nakamura Chemical Co., Ltd.) was used as the solubilizing agent. A sheet was then formed and laminated glass was obtained by the same method as Example 1.

Example 5

A resin composition was obtained by the same method as Example 1, except that polyethyleneglycol #200 dimethacrylate (NK ESTER 4G, product of Shin-Nakamura Chemical Co., Ltd.) was used as the solubilizing agent. A sheet was then formed and laminated glass was obtained by the same method as Example 1.

Example 6

A resin composition was obtained by the same method as Example 1, except that polyethyleneglycol #1000 dimethacrylate (NK ESTER 23G, product of Shin-Nakamura Chemical Co., Ltd.) was used as the solubilizing agent. A sheet was then formed and laminated glass was obtained by the same method as Example 1.

Example 7

A resin composition was obtained by the same method as Example 1, except that tripropyleneglycol propyl ether was used as the solubilizing agent. A sheet was then formed and laminated glass was obtained by the same method as Example 1.

Example 8

A resin composition was obtained by the same method as Example 1, except that the compound obtained in Preparation Example 2 was used as the copper-containing phosphorus compound, and triethyleneglycol bis(2-ethylhexanoate) (product of Acros Co.) was used as the solubilizing agent. A sheet was then formed and laminated glass was obtained by the same method as Example 1.

Example 9

A resin composition was obtained by the same method as Example 1, except that the compound obtained in Preparation Example 2 was used as the copper-containing phosphorus compound. A sheet was then formed and laminated glass was obtained by the same method as Example 1.

Example 10

A resin composition was obtained by the same method as Example 1, except that the compound obtained in Preparation Example 2 was used as the copper-containing phosphorus compound, and polyethyleneglycol #600 dimethacrylate was used as the solubilizing agent. A sheet was then formed and laminated glass was obtained by the same method as Example 1.

Example 11

A resin composition was obtained by the same method as Example 1, except that a different polyvinylbutyral resin from Example 1 (ESREK BM-1, product of Sekisui Chemical Co., Ltd.) was used as the resin and 1,3-butyleneglycol dimethacrylate was used as the solubilizing agent. A sheet was then formed and laminated glass was obtained by the same method as Example 1.

Example 12

A resin composition was obtained by the same method as Example 1, except that the compound obtained in Preparation Example 3 was used as the copper-containing phosphorus compound. A sheet was then formed and laminated glass was obtained by the same method as Example 1.

Example 13

A resin composition was obtained by the same method as Example 1, except that polyethyleneglycol #400 diisobutyrate was used as the solubilizing agent. A sheet was then formed and laminated glass was obtained by the same method as Example 1.

Example 14

A resin composition was obtained by the same method as Example 1, except that polypropyleneglycol #400 was used as the solubilizing agent. A sheet was then formed and laminated glass was obtained by the same method as Example 1.

Example 15

A resin composition was obtained by the same method as Example 1, except that tetraethyleneoxide #650 was used as the solubilizing agent. A sheet was then formed and laminated glass was obtained by the same method as Example 1.

Example 16

A resin composition was obtained by the same method as Example 1, except that triethyleneglycol di-2-ethylbutyrate (3GH) was used as the solubilizing agent. A sheet was then formed and laminated glass was obtained by the same method as Example 1.

Comparative Example 1

A resin composition was obtained by the same method as Example 1, except that a different polyvinylbutyral resin from Example 1 (S-LEK BM-1) was used as the resin and di(2-ethylhexyl)adipate (product of Tokyo Chemical Industry Co., Ltd.) was used as the solubilizing agent. A sheet was then formed and laminated glass was obtained by the same method as Example 1.

Comparative Example 2

A resin composition was obtained by the same method as Example 1, except that 1,9-nonanediol dimethacrylate was used as the solubilizing agent. A sheet was then formed and laminated glass was obtained by the same method as Example 1.

(Storage Test)

Each laminated glass obtained in Examples 1-16 and Comparative Examples 1 and 2 was used for measurement of the haze at 23° C. according to JIS K 7136, using a turbidimeter (NDH-1001DP, product of Nippon Denshoku Industries Co., Ltd.). Next the laminated glass was placed in a thermohygrostat (GST-20, product of Robert Co.) and stored under conditions of 23° C. temperature, 30% humidity, and after 2 weeks of storage, the haze of the laminated glass was measured by the same method described above. The measurement results are shown in Table 17.

(Light Resistance Test)

Each laminated glass obtained in Examples 1-16 and Comparative Examples 1 and 2 was used for measurement of the visible light transmittance according to JIS K 3106, using a spectrophotometer (U-4000, product of Hitachi, Ltd.), and then the haze was measured by the same method as in the storage test described above. After measurement of the visible light transmittance and haze, each laminated glass was exposed to ultraviolet ray-containing light for 100 hours using a xenon weather meter (ATLAS C 135, product of Toyo Seiki Seisakusho, Ltd.), for a light resistance test. After the light resistance test, the visible light transmittance and haze of the laminated glass were measured by the same method. The measurement results are shown in Table 17. The conditions for the xenon weather meter apparatus for the light resistance test were as follows.

Light source: xenon lamp,

Automatic radiation intensity: 0.83 W/m$^2$

Black panel temperature: 63° C.

(Humidity Resistance Test)

Each laminated glass obtained in Examples 1-16 and Comparative Examples 1 and 2 was used for measurement of the haze in the same manner as above, and was then subjected to high-humidity treatment by standing for 336 hours under conditions of 60° C., 90% RH. After treatment, the haze of each laminated glass was measured again. The humidity resistance of each laminated glass was evaluated based on the change in haze (Δ haze) before and after high-humidity treatment. In the evaluation of the humidity resistance, an absolute value of 20 or lower for the Δ haze was considered excellent humidity resistance and was indicated by o, while an absolute value exceeding 20 was considered poor humidity resistance and was indicated by x. The results are shown in Tables 17.

TABLE 17

|  | Storage test (Haze) | | | Light resistance test | | | Visible light transmittance (%) | | | Humidity resistance |
| --- | --- | --- | --- | --- | --- | --- | --- | --- | --- | --- |
|  | 0 days | 2 weeks | Δhaze | 0 h | 100 h | Δhaze |  |  |  |  |
| Example 1 | 10.9 | 2.4 | −8.5 | 9.6 | 8.2 | −1.4 | 80.92 | 80.65 | −0.27 | o |
| Example 2 | 9.1 | 5.1 | −4.0 | 8.4 | 6.3 | −2.1 | 80.95 | 81.06 | 0.11 | o |
| Example 3 | 4.4 | 5.2 | 0.8 | 3.2 | 48.7 | 45.5 | 83.76 | 79.62 | −4.14 | o |
| Example 4 | 9.4 | 6.9 | −2.5 | 7.3 | 47 | 39.7 | 82.23 | 79.79 | −2.44 | o |
| Example 5 | 8.3 | 6.4 | −1.9 | 3.5 | 36.1 | 32.6 | 82.44 | 78.01 | −4.43 | o |
| Example 6 | 4.4 | 36.1 | 31.7 | 4.1 | 3.8 | −0.3 | 79.86 | 80.19 | 0.33 | o |
| Example 7 | 8.2 | 8.0 | −0.2 | 8.8 | 18.9 | 10.1 | 82.58 | 77.73 | −4.85 | o |
| Example 8 | 2.3 | 2.9 | 0.6 | 2.5 | 13.2 | 10.7 | 84.29 | 74.55 | −9.74 | x |
| Example 9 | 3.6 | 3.3 | −0.3 | 2.8 | 6.6 | 3.8 | 79.04 | 79.68 | 0.64 | x |
| Example 10 | 4.0 | 4.0 | 0 | 4.2 | 7.2 | 3.0 | 81.12 | 81.66 | 0.54 | x |
| Example 11 | 3.2 | 4.8 | 1.6 | 3.4 | 35.7 | 32.3 | 81.23 | 79.12 | −2.11 | o |
| Example 12 | 19.9 | 19.8 | −0.1 | 18.5 | 51.6 | 33.1 | 80.60 | 80.21 | −0.39 | o |
| Example 13 | 7.3 | 10.1 | 2.8 | 8.6 | 8.3 | −0.3 | 79.05 | 79.32 | 0.27 | o |
| Example 14 | 4.8 | 6.8 | 2 | 4.1 | 5.9 | 1.8 | 80.97 | 80.64 | −0.33 | o |
| Example 15 | 6.4 | 6 | −0.4 | 7.1 | 7.1 | 0 | 79.28 | 77.02 | −2.26 | o |
| Example 16 | 6.5 | 10.3 | 3.8 | 4.9 | 12 | 7.1 | 82.15 | 82.02 | −0.13 | x |
| Comp. Ex. 1 | 64.2 | 78.0 | 13.8 | 64.2 | 80.2 | 16.0 | 83.46 | 82.18 | −1.28 | x |
| Comp. Ex. 2 | 12.6 | 44.4 | 31.8 | 13.6 | 40.2 | 26.6 | 82.25 | 80.44 | −1.81 | x |

Figure 2:
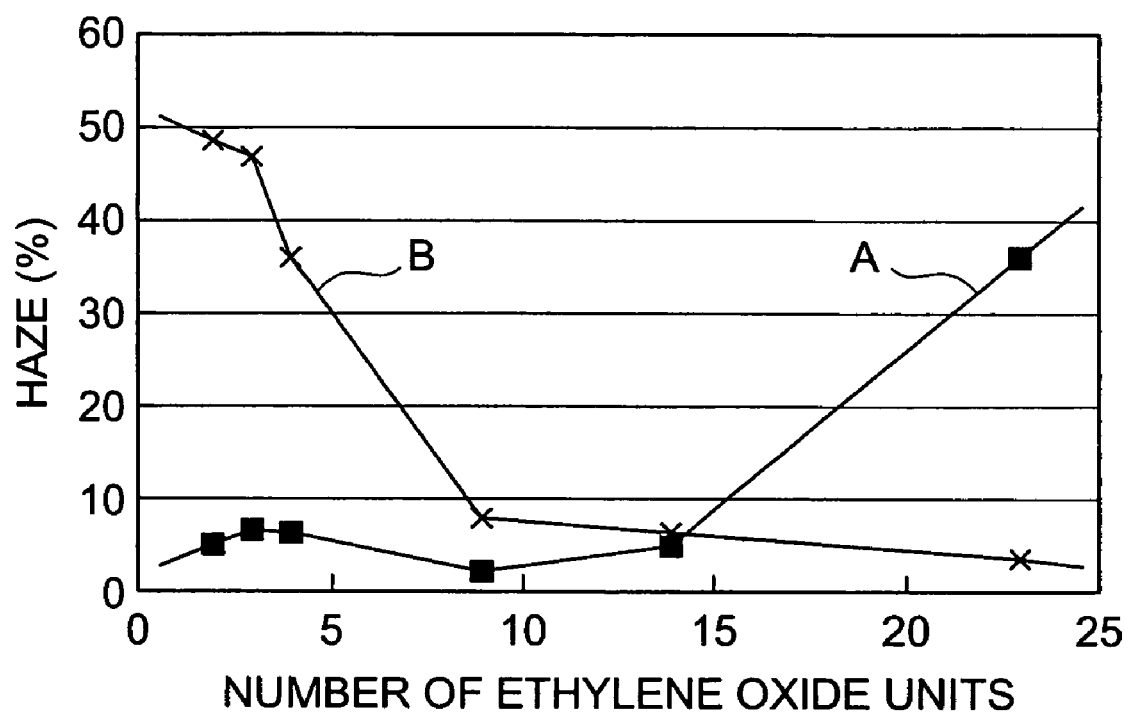
FIG. 2 is a graph showing an example of correlation between solubilizing agents and haze.

FIG. 2 shows the correlation between haze and number of repeats of oxyethylene units in the main chain of the solubilizing agent, based on the results of the storage test and light resistance test for each laminated glass obtained in Examples 1-6. In FIG. 2, "A" represents the results after the storage test and "B" represents the results after the light resistance test.

The invention claimed is:

1. A composition characterized by comprising a solubilizing agent, a copper-containing phosphorus compound and a polyvinylbutyral resin, wherein the solubilizing agent comprises a compound represented by the following general formula (100):

[Chemical Formula 1]

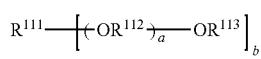
(100)

having a main chain with an oxyalkylene unit where $R^{113}$ is a group represented by the following general formula (101):

[Chemical Formula 2]

(101)

wherein a is an integer of 2-50, $R^{111}$ represents hydrogen or a b-valent organic croup, $R^{112}$ represents C2-C4 alkylene, b represents an integer of 1-4, and $R^{114}$ is an alkyl group.

2. A composition characterized by comprising a solubilizing agent, a copper-containing phosphorus compound and a polyvinylbutyral resin, wherein the solubilizing agent comprises a compound represented by the following general formula (100):

[Chemical Formula 1]

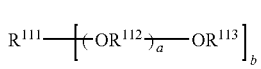
(100)

and having a main chain with an oxyalkylene unit where $R^{112}$ is ethylene and a is an integer of 9-23, and wherein $R^{111}$ represents hydrogen or a b-valent organic Group, $R^{113}$ represents alkyl, aryl or acyl and b represents an integer of 1-4.

* * * * *